(12) United States Patent
Smolic et al.

(10) Patent No.: US 10,095,953 B2
(45) Date of Patent: Oct. 9, 2018

(54) DEPTH MODIFICATION FOR DISPLAY APPLICATIONS

(71) Applicant: Disney Enterprises, Inc., Burbank, CA (US)

(72) Inventors: Aljosa Aleksej Andrej Smolic, Aargau (CH); Tunc Ozan Aydin, Burbank, CA (US); Steven Charles Poulakos, Burbank, CA (US); Simon Heinzle, Burbank, CA (US); Alexandre Chapiro, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 418 days.

(21) Appl. No.: 14/289,328

(22) Filed: May 28, 2014

(65) Prior Publication Data

US 2015/0348273 A1    Dec. 3, 2015

(51) Int. Cl.
*H04N 13/00* (2018.01)
*G06K 9/52* (2006.01)

(52) U.S. Cl.
CPC ........... *G06K 9/52* (2013.01); *H04N 13/0011* (2013.01); *H04N 13/0022* (2013.01); *H04N 2013/0088* (2013.01); *H04N 2213/005* (2013.01)

(58) Field of Classification Search
CPC .............................. H04N 13/10; H04N 13/106
USPC .......................................................... 348/54
See application file for complete search history.

(56) References Cited

U.S. PATENT DOCUMENTS

| 6,031,538 | A  | 2/2000  | Chupeau et al. |
|-----------|----|---------|----------------|
| 6,956,566 | B2 | 10/2005 | Gelb |
| RE39,342  | E  | 10/2006 | Starks et al. |
| 7,991,228 | B2 | 8/2011  | Blake et al. |
| 8,228,327 | B2 | 7/2012  | Hendrickson et al. |
| 8,300,089 | B2 | 10/2012 | Robinson |
| 2005/0190180 | A1 | 9/2005 | Jin et al. |
| 2006/0066612 | A1 | 3/2006 | Yang et al. |
| 2007/0165942 | A1 | 7/2007 | Jin et al. |
| 2008/0303893 | A1 | 12/2008 | Kim et al. |

(Continued)

FOREIGN PATENT DOCUMENTS

WO    2008139351 A1    11/2008

OTHER PUBLICATIONS

Krishnamurthy et al. "Compression and transmission of depth maps for image-based rendering" 2001 International Conference on Image Processing, (Oct. 2001), Proceedings, vol. 3, p. 828-831.

(Continued)

*Primary Examiner* — Jeffrey Williams
(74) *Attorney, Agent, or Firm* — Patterson + Sheridan, LLP

(57) ABSTRACT

Techniques of depth modification for display applications are disclosed. A multiscopic video frame, including at least first and second images depicting a scene, is received. Depth information pertaining to the multiscopic video frame is received. A depth mapping function is determined based on one or more image characteristics of the multiscopic video frame, other than depth. The depth information is modified based on the depth mapping function. At least a third image is generated based on the modified depth information and based further on at least one of the first and second images, where the third image is output for display.

20 Claims, 12 Drawing Sheets

(56) References Cited

U.S. PATENT DOCUMENTS

| | | |
|---|---|---|
| 2009/0096863 A1 | 4/2009 | Kim et al. |
| 2009/0141022 A1 | 6/2009 | Kimpe |
| 2009/0195640 A1 | 8/2009 | Kim et al. |
| 2010/0039428 A1 | 2/2010 | Kim et al. |
| 2010/0091093 A1 | 4/2010 | Robinson |
| 2010/0302234 A1 | 12/2010 | Kao et al. |
| 2011/0001792 A1 | 1/2011 | Pandit et al. |
| 2011/0032338 A1 | 2/2011 | Raveendran et al. |
| 2011/0069224 A1* | 3/2011 | Gross .................... G06T 3/0012 348/441 |
| 2011/0109720 A1 | 5/2011 | Smolic et al. |
| 2011/0199465 A1 | 8/2011 | Barenbrug et al. |
| 2013/0057644 A1 | 3/2013 | Stefanoski et al. |
| 2014/0313191 A1* | 10/2014 | Bruls et al. ............. G06T 15/04 345/419 |
| 2015/0043808 A1* | 2/2015 | Takahashi .......... H04N 13/0022 382/154 |

OTHER PUBLICATIONS

Redert et al.: "Visualization of arbitrary-shaped 3D scenes on depth-limited 3D displays", USA, IEEE, Sep. 6, 2004, pp. 938-942 <10.1109/TDPVT.2004.1335416>.

Coles. Warren. Examination Report: Patent Application No: 589170. Intellectual Property Office of New Zealand, dated Nov. 18, 2010, Wellington, New Zealand, Nov. 18, 2010, Wellington, New Zealand.

Kadir, Timor et al., Saliency, Scale and Image Description, International Journal of Computer Vision, Nov. 2001, vol. 45, Issue 2, Kluwer Academic Publishers, Hingham, United States.

Senoh, T. et al: "AHG8: Draft Text for Signaling of Alternative 3D Format in ISO/IEC 14496-10 (ITU-T H.264)", 3. JCT-3V Meeting; 103. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-00048, Jan. 10, 2013.

Nikolce Stefanoski: "3DV: Results on coding of warps using HEVC", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, No. JCT3V-A0004, Jul. 10, 2012.

Nikolce Stefanoski: "AHG8: Draft Text for Signaling Warp Maps as an Alternative 3D Format in 3D-HEVC", 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D0103, Apr. 13, 2013.

Senoh, T. et al: "AHG8: Draft Text for Signaling Global View and Depth as an Alternative 3D Format in 3D-HEVC", 4. JCT-3V Meeting; Apr. 20, 2013-Apr. 26, 2013; Incheon; (The Joint Collaborative Team on 3D Video Coding Extension Development of ISO/IEC JTCI/SC29/WGII and ITU-T SG.16); URL: http://phenix.int-evry.fr/jct2/, No. JCT3V-D0272, Apr. 15, 2013.

Smolic, A. et al: "Image Domain Warping as Alternative to DIBR for Advanced 3DV Applications", 96. MPEG Meeting; Mar. 21, 2011-Mar. 25, 2011; Geneva; (Motion Picture Expert Group or ISO/IEC JTCI/SC29/WGII) No. m19995, Mar. 15, 2011.

European Search Report for EP 14164611.7, dated Jul. 18, 2014.

U.S. Appl. No. 14/141,088, entitled "Signaling Warp Maps Using a High Efficiency Video Coding (HEVC) Extension for 3D Vidoe Coding", filed Dec. 26, 2013.

* cited by examiner

DEPTH MODIFICATION FOR DISPLAY APPLICATIONS

CROSS-REFERENCE TO RELATED APPLICATIONS

This application is related to U.S. patent application Ser. No. 12/766,734 (now U.S. Pat. No. 8,711,204), filed Apr. 23, 2010, which claims benefit of U.S. provisional patent application Ser. No. 61/296,425, filed on Jan. 19, 2010, and U.S. provisional patent application Ser. No. 61/260,274, filed on Nov. 11, 2009. This application is also related to co-pending U.S. patent application Ser. No. 13/601,363, filed on Aug. 31, 2012, and which is a continuation-in-part of the above-identified U.S. patent application. Each of the aforementioned patent applications is herein incorporated by reference in its entirety.

BACKGROUND

Human beings typically see using stereoscopic vision. The left and right eyes of an observer each perceives slightly different views of a scene, and the brain of the observer fuses the slightly different views into a single image that provides depth information. The depth information allows the observer to perceive the relative distance to various objects in the scene. Movies filmed with a single camera may not provide such depth information to the viewer and thus tend to look flat.

Early efforts in 3-D movie technology used anaglyphs, in which two images of the same scene, with a relative offset between them, are superimposed on a single piece of movie film, with the images being subject to complimentary color filters (e.g., red and green). Viewers donned special glasses so that one image would be seen only by the left eye while the other would be seen only by the right eye. When the brains of the viewers fused the two images, the result was the illusion of depth. In the 1950s, "dual-strip" projection techniques were widely used to show 3-D movies. Using dual-strip projection techniques, two films were projected side-by-side in synchronism, with the light from each projector being oppositely polarized. Viewers wore polarizing glasses, and each eye would see only one of the two images. More recently, active polarization has been used to distinguish left-eye and right-eye images. Left-eye and right-eye images are projected sequentially using an active direction-flipping circular polarizer that applies opposite circular polarization to the left-eye and right-eye frames. The viewer dons glasses with opposite fixed circular polarizers for each eye, so that each eye sees only the intended frames. Various other systems for projecting 3-D movies have also been used over the years.

3-D movies have been played in theatres and in home entertainment systems. The 3-D movies may be produced using stereoscopic techniques. Stereoscopic techniques create an illusion of depth from a pair of 2-D images, each of which is presented to a separate eye of a viewer. The pair of 2-D images may represent two slightly different perspectives of a scene. The slightly different perspectives may resemble the natural, binocular vision of the eyes of the viewer. By presenting 2-D images of slightly different perspectives to the right eye and to the left eye of the viewer, respectively, the viewer may perceive a three dimensional composite of the 2-D images, in which certain objects of the scene appear nearer to the viewer than other objects of the scene. That is, the brain of the viewer may merge or fuse the left and right eye images to create a perception of depth.

The degree of offset of objects in the image pair determines the depth at which the objects are perceived by the viewer. An object may appear to protrude toward the viewer and away from the neutral plane or screen when the position or coordinates of the left eye image are crossed with the position or coordinates of the right eye image (e.g., negative parallax). In contrast, an object may appear to recede or be behind the screen when the position or coordinates of the left eye image and of the right image are not crossed (e.g., positive parallax).

Some movies are filmed (in the case of live action movies) or imaged (in the case of rendered animations) in stereo for 3-D viewing. Image frames used to produce stereoscopic video (or stereo video) may be referred to as stereoscopic images. An image frame (or simply, frame) refers to an image at a specific point in time. An illusion of motion may be achieved by presenting multiple frames per second (fps) to the viewer, such as twenty-four to thirty fps. A frame may include content from a live action movie filmed with two or more cameras. A frame may also include content from a rendered animation that is imaged using two camera locations. In stereo video, stereoscopic perception results from presenting a left eye image stream and a right eye image stream to the viewer.

SUMMARY

Embodiments presented in this disclosure provide a computer-implemented method, non-transitory computer-readable medium, and system to perform an operation that includes receiving a multiscopic video frame including at least first and second images depicting a scene. The operation also includes receiving depth information pertaining to the multiscopic video frame. The operation also includes determining a depth mapping function based on one or more image characteristics of the multiscopic video frame, other than depth. The operation also includes modifying the depth information based on the depth mapping function. The operation also includes generating at least a third image based on the modified depth information and based further on at least one of the first and second images, where the third image is output for display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features presented in this disclosure can be understood in detail, a more particular description of the features, briefly summarized above, may be had by reference to embodiments, some of which are illustrated in the appended drawings. It is to be noted, however, that the appended drawings illustrate only typical embodiments presented in this disclosure and are therefore not to be considered limiting of its scope, for aspects presented in this disclosure may admit to other equally effective embodiments.

DETAILED DESCRIPTION

Embodiments presented in this disclosure provide techniques of depth modification for display applications such as content adaptive depth mapping. More specifically, depending on the embodiment, the display applications may include, without limitation, stereoscopic-to-multiview conversion for glasses-free stereoscopic displays, display adaptation for non-multiview stereoscopic displays, and artistic modification of a captured non-multiview stereoscopic scene. Glasses-free stereoscopic displays are also referred to herein as autostereoscopic displays, and stereoscopic-to-multiview conversion is also referred to herein as stereo-to-multiview conversion. At least in some embodiments, the autostereoscopic displays are multiview autostereoscopic displays, which are configured to provide perception of movement parallax, such as left-right movement parallax.

Although embodiments may be described in conjunction with disparity or depth, such is not intended to be limiting of described embodiments. In particular, because disparity is inversely proportional to depth, such that a smaller disparity value corresponds to a larger depth distance, the decision of whether to use disparity or depth may be tailored to suit the needs of a particular case. Accordingly, disparity-based implementations, depth-based implementations, and combinations thereof are broadly within the scope of disclosed embodiments. Put another way, depth may be represented in the form of depth values or disparity values, depending on the embodiment, and likewise for disparity. Provided that the relationship between depth and disparity is accounted for, the terms "depth" and "disparity" may herein be regarded as interchangeable, at least for purposes of the present disclosure.

As used herein, the term "movie" refers to any sequence of images that, when viewed in succession, produces the effect of viewing a moving image. The images may be live-action, computer-generated, or a mix of live-action and computer-generated elements. The sequence may have any length desired (e.g., two minutes to two or more hours). The images may be captured and/or displayed using analog or digital media or a combination thereof (for example, a computer-generated image printed onto movie film). A "shot" refers to a subset of a movie during which camera parameters are either held constant or smoothly varied. A movie may include any number of shots. A "scene" refers to a subset of a movie that relates a continuous (e.g., in time and place) sequence of events. A scene may be composed of multiple shots.

Figure 1:
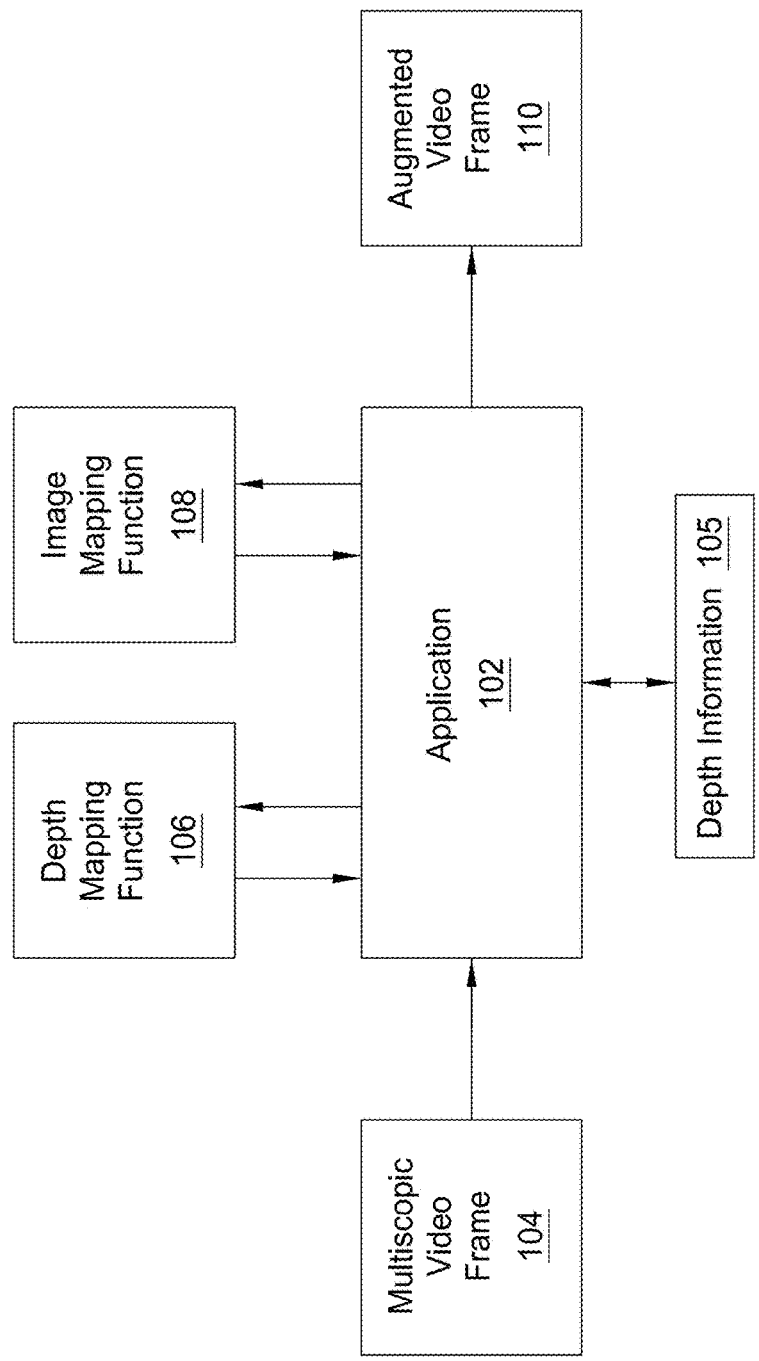
FIG. 1 is a block diagram illustrating a system for depth modification for display applications, according to one embodiment presented in this disclosure.

FIG. 1 is a block diagram illustrating a system 100 for depth modification for display applications, according to one embodiment presented in this disclosure. As shown, the system 100 includes an application 102 for depth modification. In a particular embodiment, the application 102 is configured to generate multiview output for a target autostereoscopic display and by augmenting a received multiscopic video frame 104 that includes at least first and second images depicting a scene, thereby producing an augmented video frame 110. To that end, the application 102 determines a depth mapping function 106 based on one or more image characteristics of the multiscopic video frame 104, other than depth. Depending on the embodiment, depth information 105 pertaining to the multiscopic video frame may be received or generated by the application 102. The application 102 modifies the depth information 105 based on the depth mapping function 106. In some embodiments, the depth information 105 is modified in order to conform or compress depth information to a depth range supported by the target autostereoscopic display, also referred to herein as depth compression. The application 102 generates a third image based on the modified depth information and based further on at least one of the first and second images.

In a particular embodiment, the application 102 also analyzes the first and second images to determine the one or more image characteristics other than depth. The application 102 optionally further modifies the depth information 105 in order to alter a depth gradient of at least one salient region depicted in the first and second images. In some embodiments, the depth information is further modified in order to facilitate restoring the perceived depth and salient scene structure. The application 102 also determines an image mapping function 108 based on the modified or further-modified depth information, where the third image is generated based on the image mapping function and 108 at least one of the first and second images.

In one embodiment. the multiscopic view frame is augmented to include the third image in order to form multiview output of the scene and for the target autostereoscopic display. At least in some cases, doing so produces depth-enhanced multiview content from stereoscopic images in a manner that preserves artistic composition of the scene and perceived depth of the scene even beyond a predefined degree of depth compression, while also extending a perceived disparity range of the scene. Depending on the embodiment, the perceived disparity range of the scene may be extended even if the actual disparity range of the scene remains the same.

Although multiview autostereoscopic displays are expected to become available in consumer markets in the near future, the current level of autostereoscopic technology is not without its limitations. For instance, constraints on the depth range of multiview autostereoscopic displays may often be significant. Such may be the case notwithstanding emergence of displays with increased resolution, such as those having a horizontal resolution on the order of four thousand or more pixels, which may alleviate the constraints to a certain extent. On the other hand, autostereoscopic content creation still lacks tools and standards for mainstream deployment of multiview autostereoscopic display technologies. In particular, content creation for non-multiview stereoscopic video for glasses-based systems is just developing and maturing. Non-multiview stereoscopic video may also be referred to herein as dual-view stereoscopic video. Even with the emergence of multiview autostereoscopic display technologies, because it takes time for content creators to migrate to new technologies, non-multiview stereoscopic video should still remain in use for the foreseeable future. Consequently, support for legacy stereoscopic content through stereo-to-multiview conversion will likely be a key feature for ensuring a smooth and backwards-compatible transition from dual-view stereoscopic video to multi-view stereoscopic video.

At least in some embodiments, one limitation of faithful stereoscopic-to-multiview conversion is that the disparity range of non-multiview stereoscopic scenes often exceeds the depth range limitations of multiview autostereoscopic displays. However, stereo-to-multiview conversion techniques such as depth-image based rendering and image domain warping interpolate between two input views and do not necessarily take into account the depth range limitations of autostereoscopic displays. Further, unlike the early days of stereoscopy, depth layouts are increasingly being used as an artistic element to support narrative and action of scene content. Accordingly, at least in some embodiments, a workflow for autostereoscopic content creation should 1) reduce the depth range of scene content to comply with limits of multiview autostereoscopic display technology, and 2) preserve artistic intent and perceived depth layout at least to a certain extent.

Some alternative approaches involve content filtering based on the depth range of multiview autostereoscopic displays. Further, depth remapping may be performed based on just-noticeable differences (JND) of depth perception. To create multiview content, blurring may be performed in addition to depth compression. Such content alternation may be unsuitable from a creative standpoint at least in some cases, however. For instance, objects far into the distance in a depicted scene may be blurred, even though such objects may actually be the most salient objects based on artistic intent. Further, the alternative approaches have not necessarily been evaluated in the contexts of synthetic content, where perfect disparity information may be present, or for live action content, where imperfect disparity information may pose additional challenges. Accordingly, in some embodiments, stereo-to-multiview conversion is addressed from the point of view of content creation. Rather than using JND as a basis for depth remapping, noticeable disparity differences in non-salient regions may be sacrificed.

At least some embodiments involve determining a range of disparities that are perceived as pleasant but that exceed the theoretical limit of multiview autostereoscopic displays. The range of disparities may be determined based on predefined criteria such as impact of disparity and texture frequency on perceived picture quality. A depth mapping function is then determined that retains an overall depth layout of the scene but that aims to maintain the volume of salient objects in order to avoid cardboarding, which refers to a type of visual artifact characterized by a voluminous object having an unnaturally flat appearance when depth compressed. To that end, the depth mapping is performed in two steps at least in some embodiments. First, a global non-linear mapping operator is used to transform the overall depth range of the scene to the range of the target autostereoscopic display. Second, the depth gradients are locally modified in order to reduce any cardboarding effects. In some embodiments, both global depth mapping and local gradient modification are based on a predefined image characteristic, such as saliency. Multiview content may then be generated from the input views using image domain warping techniques suited to extend a perceived disparity range of scene content.

Accordingly, content creation for multiview autostereoscopic displays may pose an unresolved challenge in many respects. These displays use multiple input views, while the number of views and depth-of-field limitations are often unknown during production time. Some approaches generate multiview images from stereo footage or video depth, using techniques such as depth-image based rendering or image domain warping. These techniques determine how to warp the input images to new viewing positions disposed between the input views. However, these techniques may not necessarily consider appropriate mapping of disparity ranges. As a result, the resulting images may have undesirable artifacts that cause perception of image flatness. In this regard, depth adaptation may be used to adjust existing stereo images based on predefined remapping operators. To that end, image domain warping based on saliency may be used in a manner that targets multiview autostereoscopic displays and view interpolation with perceived disparity range extension while also locally modifying disparity gradients of the scene. Consequently, salient scene elements may be preserved at a cost of potentially having just-noticeable differences of depth perception in less salient image regions, thereby favoring artistic intent over user perception at least in some cases.

At least in some embodiments, disparity influences perceived image quality in terms of salient object aliasing across different views of a scene. This influence is a result of depth of field of the multiview display rather than other effects such as vergence-accommodation conflict. Spatial frequency may also influence perceived image quality to a lesser extent and in terms of salient object aliasing across different views of the scene. Further, at least in some embodiments, a disparity range that is twice the size of the display depth-of-field only creates noticeable artifacts in higher texture frequencies, and perceived image quality only degrades linearly for still higher disparities. Other lenticular or parallax-barrier-based multiview displays likely exhibit similar characteristics. Accordingly, desirable disparity ranges may be determined based on the spatial frequency of the scene content. At least in some cases, a maximum value of ±5 pixels in disparity has proven useful to achieve good image quality while allowing for twice the supported depth range.

Figure 2:
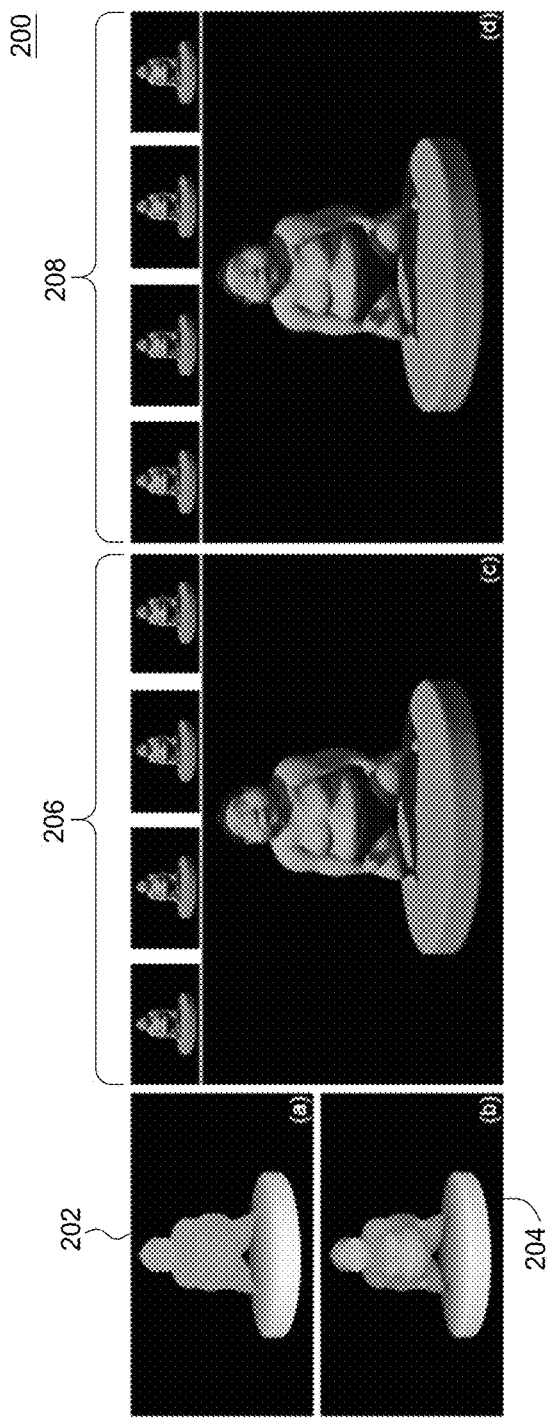
FIG. 2 is a depiction of disparity maps and resultant, augmented multiscopic video frames, according to one embodiment presented in this disclosure.

FIG. 2 is a depiction 200 of disparity maps and resultant, augmented multiscopic video frames, according to one embodiment presented in this disclosure. As shown, the depiction 200 includes a disparity map 202 representing linearly mapped disparities, which is used to generate the augmented multiscopic video frame 206. The depiction 200 also includes a disparity map 204 determined based on saliency, which is used to generate the augmented multiscopic video frame 208 using techniques disclosed herein. The multiscopic video frame 208 reduces or eliminates cardboarding effects present in the multiscopic video frame 206. Accordingly, the techniques disclosed herein may produce depth-enhanced multiview content from stereo images while preserving original artistic intent.

Figure 3:
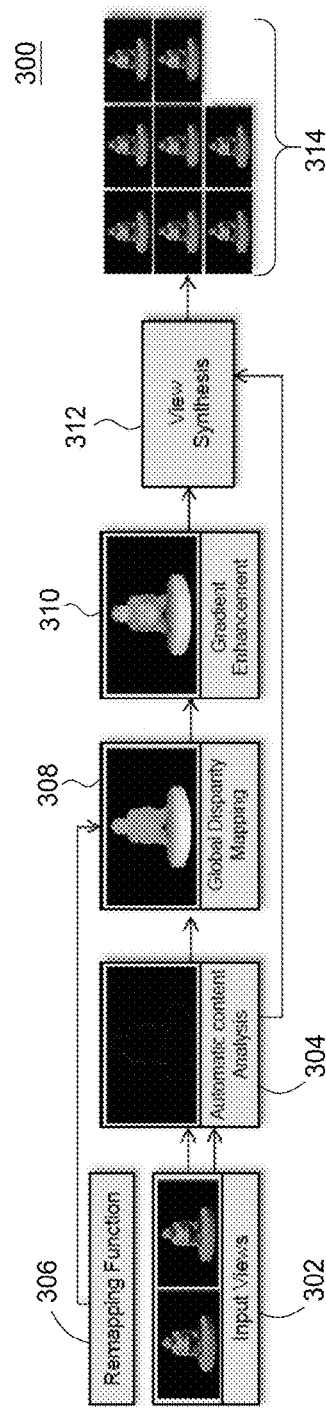
FIG. 3 depicts a pipeline for stereoscopic-to-multiview conversion, according to one embodiment presented in this disclosure.

FIG. 3 depicts a pipeline 300 for stereo-to-multiview conversion for autostereoscopic displays, according to one embodiment presented in this disclosure. As shown, the pipeline 300 includes an automatic content analysis stage 304, a global depth mapping stage 308, a local gradient enhancement stage 310, and a view synthesis stage 312. In the automatic content analysis stage 304, the application 102 analyzes input views 302 of a multiscopic video frame to determine predefined image characteristics, such as saliency and edges. In the global disparity mapping stage 308, the application 102 determines a remapping function 306 based on the image characteristics and applies the remapping function 306 to compress the input disparity space to the disparity range of the target display. The remapping function may also be referred to herein as a depth or disparity mapping function, and in a particular embodiment, the remapping function is a global non-linear mapping function. In the local gradient enhancement stage 310, the application 102 modifies flattened image regions of salient objects in the scene to restore perceived depth and salient scene structure. In the view synthesis stage 312, the application 102 applies image domain warping to synthesize output views 314 for multiview display, where the output views 314 constitute an augmented multiscopic video frame.

As described above, the disparity range of stereoscopic content may often be ill-suited for multiview autostereoscopic displays, which tend to support a smaller disparity range. In many cases, the overall disparity range of autostereoscopic displays is greater than that of non-multiview stereoscopic content. In some embodiments, given an autostereoscopic display having views denoted as A|B|C|D|E|F|G|H, the disparity range of A to H is often approximately twice as large as the disparity range of the related stereoscopic content. When a user views content output by an autostereoscopic display, only two adjacent views are visible, such as C|D. This means that the user would observe a scene with only $(1/7)*(2) \approx 0.3$ of the original disparity. Further, in the context of multiview conversion of live action content, specific challenges may exist in the form of disparity estimation. In particular, estimated disparity maps may contain artifacts and imperfections, of which cardboard effects and estimation failures are the most severe in some cases. In cardboarding effects, gradients across objects may often be absent, which can result in flat disparity regions partitioned into multiple layers. Further, estimation failures can lead to drastic changes in disparity or holes in estimation. Gradient-based approaches alone, described in further detail below, may not necessarily be well suited for such discontinuous content. As a result, global depth compression and local depth enhancement is applied at least in some cases.

As specified above, the pipeline for stereo-to-multiview conversion begins by globally transforming the input disparity space into a new, piecewise linear disparity space better suited for the device-dependent limits of multiview autostereoscopic displays. In this regard, the mapping operation is suited for live-action input using piecewise linear disparity maps, as well as rendered content using continuous disparity maps. The piecewise linear mapping function uses saliency characteristics of the input views to maintain, at least to a certain extent, an uncompressed characteristic of salient regions in the scene, hiding distortions in less salient regions of the scene.

Assuming the original disparity map contains disparity values in a space $[d_{min}, d_{max}]$, in which case the mapping is a function $f: [d_{min}, d_{max}] \to [d'_{min}, d'_{max}]$. In a piecewise linear approach, the domain of the function f is divided into n equally sized bins that are linearly mapped to bins in the co-domain. Thus, the linear function $f_i: [d_{min}^i, d_{max}^{i+1}] \to [d'_{min}^i, d'_{max}^{i+1}]$ is of the form $f_i(x) = \Delta_i x + \alpha_i$, where $\alpha$ represents a compression factor for local disparity remapping. Defining $R = d_{max}^{i+1} - d_{min}^i$ and $R' = d'_{max}^{i+1} - d'_{min}^i$, a linear function would then be equivalent to a single bin with $\Delta = R'/R$, where $\Delta$ represents a factor by which disparity is compressed, R represents the original disparity range, and R' represents the modified disparity range. Further, $\Delta_i$ is to satisfy the following conditions:

$$\sum_{i=1}^{n} \Delta_i = \Delta, \quad \text{(Equation 1)}$$

$$\Delta_i \geq 0, \forall i.$$

Satisfying the above conditions ensures that the disparities are mapped exactly into the target space and that the three dimensional position of pixels is not reversed. Put another way, a pixel would not be mapped to a position in front of another pixel if the former was originally behind the latter. Given these conditions and further defining $s_i$ as the sum of the saliency values of all pixels in the bin i, the following solution is proposed:

$$\Delta_i = \frac{s_i}{\sum_{j=1}^{n} s_j} \Delta k + (1-k) \frac{\Delta}{n} \quad \text{(Equation 2)}$$

where n represents a set of bins, i and j represent iterators over the set of bins.

The coefficient $k \in [0,1]$ is a compression safeguard parameter that controls an extent to which a given bin may be compressed. In a particular embodiment, a value of k=1 reverts the mapping to a default, linear mapping, whereas a value of k=0 indicates that bins not having any salient pixels will have disparity removed completely.

Figure 4:
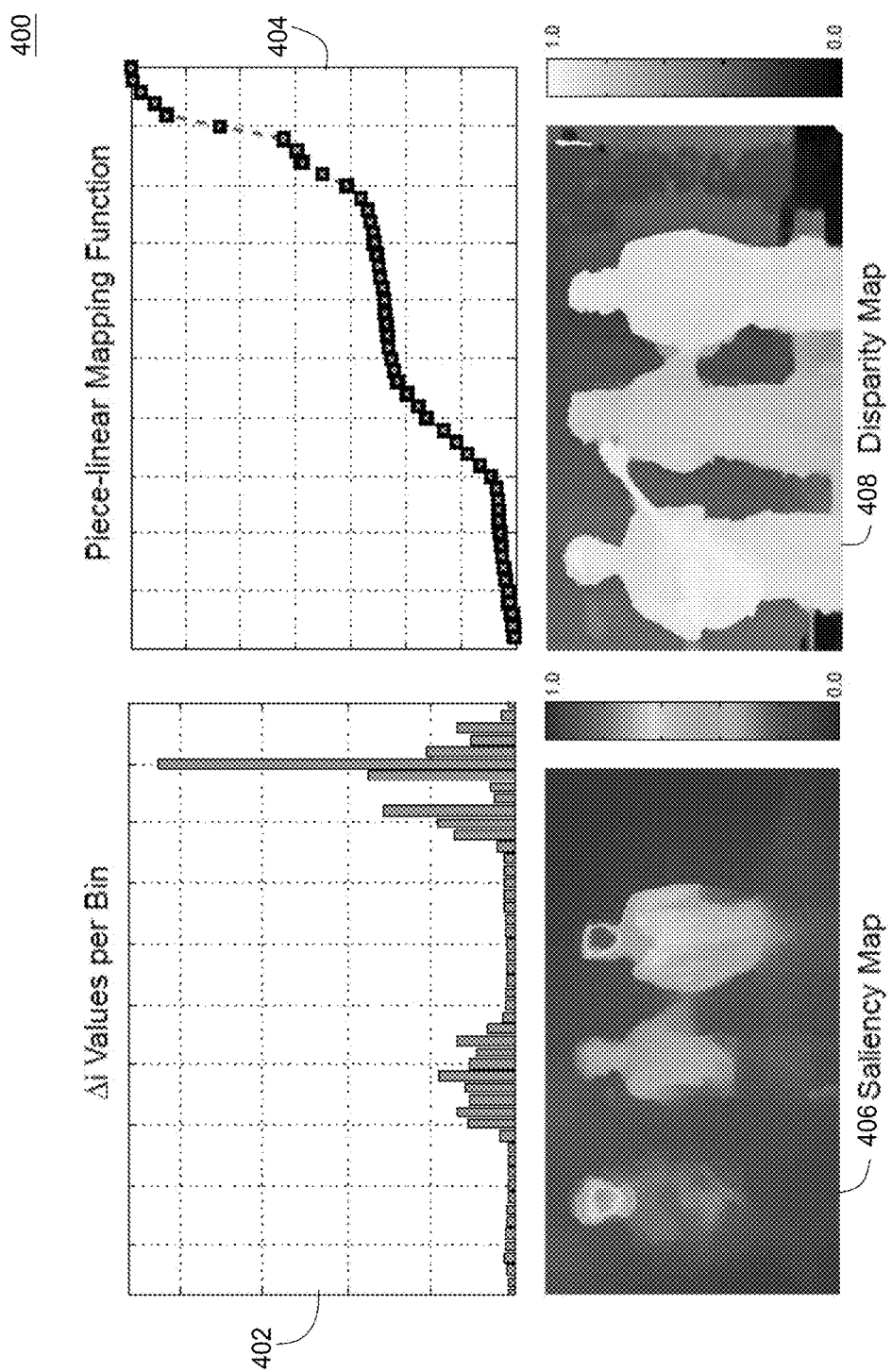
FIG. 4 is a depiction of depth mapping for stereo-to-multiview conversion, according to one embodiment presented in this disclosure.

FIG. 4 is a depiction 400 of depth mapping for stereo-to-multiview conversion, according to one embodiment presented in this disclosure. As shown, the depiction 400 includes a representation 404 of the piecewise linear mapping function described above, along with a representation 402 of respective Δi values per bin. The depiction 400 also includes a saliency map 406 generated from analyzing the input views. The depiction 400 further includes a disparity map 408 corresponding to the saliency map 406. In some cases, the depth mapping may be sensitive to any temporal instability in saliency. To prevent temporal instability of the global mapping function, saliencies may be filtered out over several frames so that disparity remapping is similar across consecutive images. On the other hand, an alternative approach integrates over saliency instead of computing a piecewise linear function, and does not provide a compression safeguard parameter k.

Figure 5:
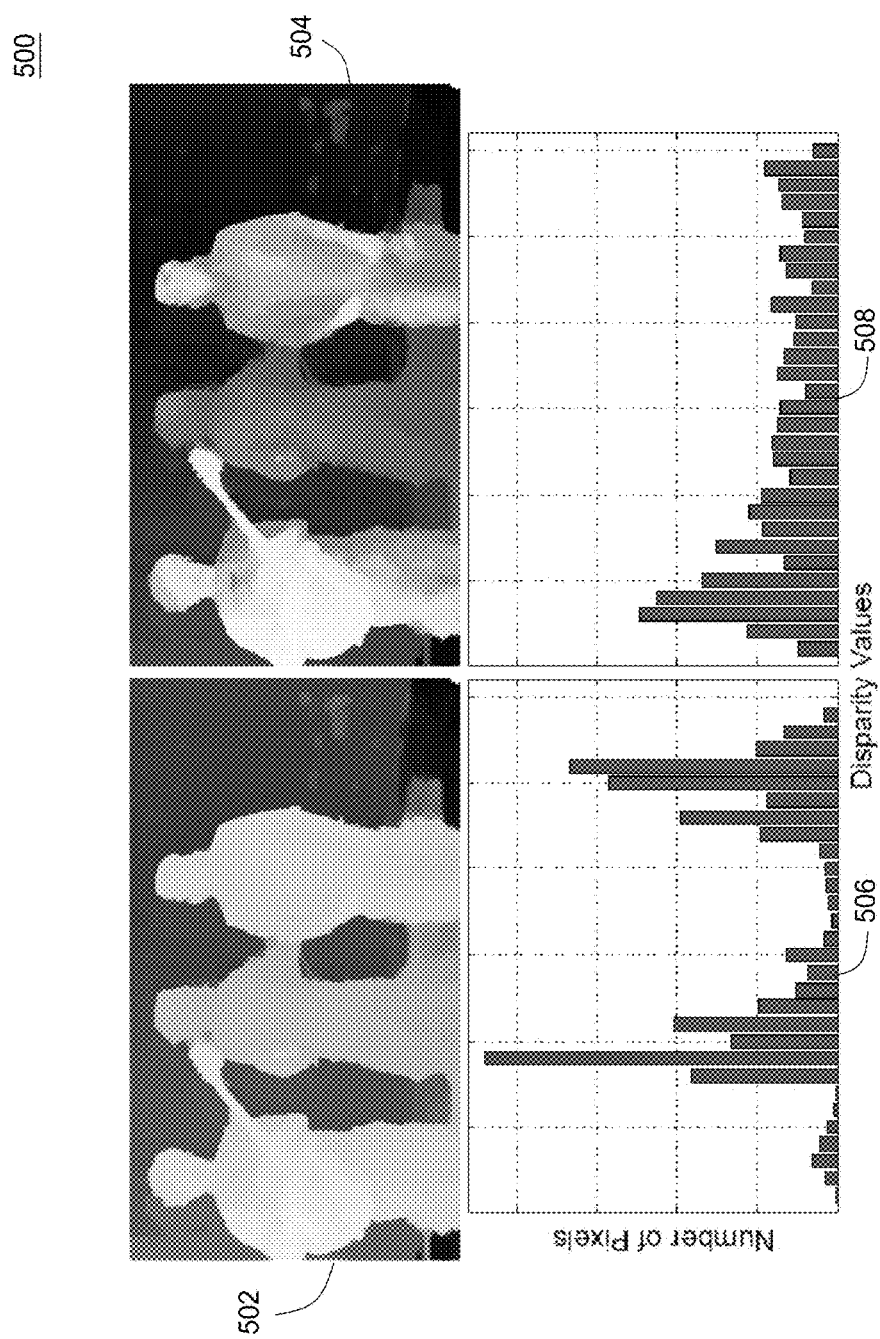
FIG. 5 is a depiction of results from piecewise linear global mapping as compared to linear mapping, according to one embodiment disclosed herein.

FIG. 5 is a depiction 500 of results from piecewise linear global mapping as compared to linear mapping, according to one embodiment presented in this disclosure. In both cases, the input disparity is mapped to a fraction of the input disparity range. As shown, the depiction 500 includes results 504 from piecewise linear global mapping, along with an associated histogram 508 conveying resultant number of pixels per given disparity value. The depiction 500 also includes results 502 from the alternative approach of linear mapping, along with an associated histogram 506 conveying resultant number of pixels per given disparity value. The histograms 506, 508 indicate that piecewise linear global mapping compresses non-salient or empty spaces while retaining disparity of salient objects, at least relative to linear mapping. Doing so may at least in some cases improve perceived depth in viewing the scene. At least in some embodiments, the pipeline supports any arbitrary global mappings, including user- and system-defined mappings, and at least in principle, all C0-continuous and monotonically increasing functions are allowed.

As described above, in some embodiments, after performing global depth mapping, the application 102 performs a local mapping step involving modifying disparity gradients in salient image regions and in order to increase depth perception. The disparity gradients may be modified based on a predefined set of constraints. In a particular embodiment, the set of constraints are solved via least-squares energy minimization in order to determine a locally enhanced disparity map $D_L$. In the following discussion, let $x \in R^2 = (x,y)$ denote an image position, and let $D(x) \in R$ denote a disparity map.

At least in some embodiments, the application 102 enforces a gradient constraint specifying that the mapped disparity gradients of salient image regions are to be similar to the gradients of the input disparity map $D_I$:

$$\frac{\partial}{\partial x} D_L(x) = \alpha \frac{\partial}{\partial x} D_I(x),$$ (Equation 3)

$$\frac{\partial}{\partial y} D_L(x) = \alpha \frac{\partial}{\partial y} D_I(x).$$

In some embodiments, the global parameter $\alpha$ is a constant factor to control the overall disparity enhancement and is dependent on the disparity compression from the previous global mapping. At least in some embodiments, the factor of $\alpha = 2(d_{range}/d'_{range})$ may be used, where $d_{range}$ and $d'_{range}$ are the disparity ranges before and after the global mapping, respectively. The application 102 may additionally enforce global mapping constraints specifying that the overall mapping is to closely follow the global mapped disparity $D_G$:

$$D_L(x) = D_G(x)$$ (Equation 4)

These constraints may then be rewritten as part of a linear, least-squares energy minimization problem. Let $S(x,y): R^2 \in (0, 1]$ denote a saliency map that classifies salient image regions. In some implementations, a predefined, trace amount of saliency is added to all pixels in order to prevent null weights in the constraints. Equations 2 and 3 may then be rewritten as:

$$E_g(D_L) = \sum_x S(x) \|\nabla D_L(x) - \alpha \nabla D_I(x)\|^2$$ (Equation 5)

where $\nabla$ is the vector differential operator, and where $\|\cdot\|$ defines the vector norm. The global mapping constraints from Equation 4 may then be reformulated as:

$$E_l(D_L) = \sum_x (D_L(x) - D_G(x))\|^2.$$ (Equation 6)

The linear least squares solution for $D_L(x)$ may then be found by minimizing:

$$\underset{D_L}{\mathrm{argmin}}(w_g E_g(D_L) + w_l E_l(D_L))$$ (Equation 7)

where the minimum may be computed by solving a linear system.

At least in some embodiments, the system defined in Equation 7 is configured to enhance the gradients of salient regions while enforcing all other disparity values towards their globally mapped version $D_G$. Disparity edges, i.e., disparity gradients having a threshold strength and between objects at different depths, may lead to a high contribution to the squared error in the system, and as a result, such disparity edges are also enforced.

In some embodiments, the gradient constraint can lead to artifacts around disparity edges in cases of high disparity gradients between objects. Accordingly, some embodiments remove the influence of such disparity edges, such that the gradient enhancement is enforced only within objects. Because disparity edges may be robustly detected on the disparity map, a combination of a predefined threshold function and a Canny edge detector may be used on the input disparity $D_I$ in order to determine a set of edge pixels E. Subsequently, salience values may be enforced to have a value of zero at these edge pixels $S(x)=0$ for $x \in E$.

Figure 6:
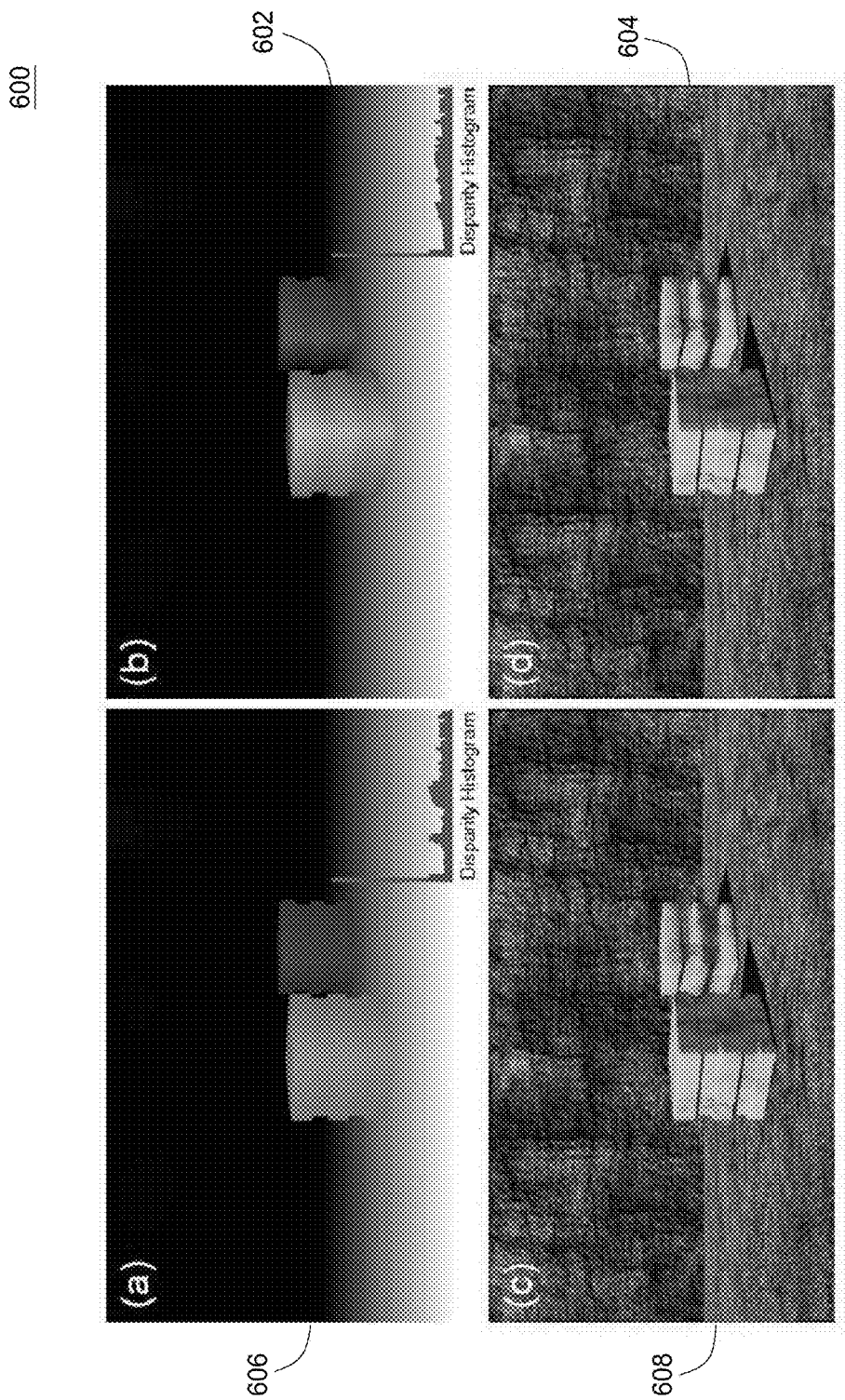
FIG. 6 is a depiction of results from local disparity gradient enhancement as compared to linear mapping, according to one embodiment presented in this disclosure.

FIG. 6 is a depiction 600 of results from local disparity gradient enhancement as compared to linear mapping, according to one embodiment presented in this disclosure. As shown, the depiction 600 includes a disparity map 602 resulting from local disparity gradient enhancement, along with a corresponding view 604. The depiction 600 also includes a disparity map 606 resulting from linear mapping, along with a corresponding view 608. The views 604, 608 are shown in anaglyph, in a disparity range similar to two adjacent views of a multiview autostereoscopic display. As shown, the cardboarding effect flattens out the three dimensional cube in the view 608, at least relative to the view 604. Put another way, the cubes in the view 604 appear to be more voluminous, while the cubes in the view 608 appear flatter.

As described above, in some embodiments, after performing local disparity gradient enhancement, the application 102 applies image domain warping to synthesize output views for multiview display. To this end, image domain warping techniques may be extended for application in the context of stereo-to-multiview interpolation. The previously computed disparity maps may be used as an input to image domain warping. Based on the disparity maps, a constrained energy minimization problem may be formulated and solved by linear least squares optimization to produce image mapping functions. The image mapping functions are warp functions that deform the input views to generate interpolated views. The optimized disparity map $D(x): R^2$ is used to compute a warp $w(x): R^2 \to R^2$, where the deformations are to be hidden in less salient regions of the scene, where the warp $w(x)$ describes transformation of the input view corresponding to $D(x)$.

In one embodiment, the constraints of the energy minimization problem may include disparity constraints. These disparity constraints can be viewed as positional constraints:

every point in the image should be transformed to the position described by the disparity value:

$$w(x) = \begin{bmatrix} x + D(x) \\ y \end{bmatrix}. \quad \text{(Equation 8)}$$

Additionally or alternatively, the constraints may include conformal constraints that penalize local deformations and that are mainly evaluated on salient regions. A constraint of the form $$\frac{\partial}{\partial x} w(x)^{(x)} = 1$$

prescribes to avoid any compression or enlargement along the x-direction, whereas a constraint of the form $$\frac{\partial}{\partial x} w(x)^{(y)} = 0$$

penalizes deformations that result in a pixel-shear operation. These constraints may thus be formulated as:

$$\frac{\partial}{\partial x} w(x) = \begin{bmatrix} 1 \\ 0 \end{bmatrix}, \frac{\partial}{\partial y} w(x) = \begin{bmatrix} 0 \\ 1 \end{bmatrix}. \quad \text{(Equation 9)}$$

At least in some embodiments, the constraints may include depth ordering constraints. Because disparity edges often have gradients that markedly differ from those of neighbors, edge detection may be used to reduce their saliency values. Doing so may eliminate or reduce artifacts at least in some cases. To this end, the previously computed edge map may be used. Further, pixel overlaps often occurs for large warps where the correct order of pixels along a line is reversed, and distortions may be generated as a result during warp optimization. Accordingly, to resolve such conflicts, a check may be performed where, in case of an overlap, an occluded pixel is moved to the coordinate of its occluder.

In one embodiment, applying the above-described constraints results in output images that with appropriate disparity values and with distortions hidden in non-salient areas. However, when applying the constraints for each frame of a video sequence, small changes in the input might result in larger changes within the optimization, which may lead to disturbing temporal artifacts in some cases. In some embodiments, this may be remedied by introducing a temporal constraint that takes into account the warps calculated for previous frames as an additional disparity constraint. Doing so effectively makes the constraints three-dimensional, linking temporally separated pixels, as shown below:

$$w_t(x) = w_{t-1}(x). \quad \text{(Equation 10)}$$

Figure 7:
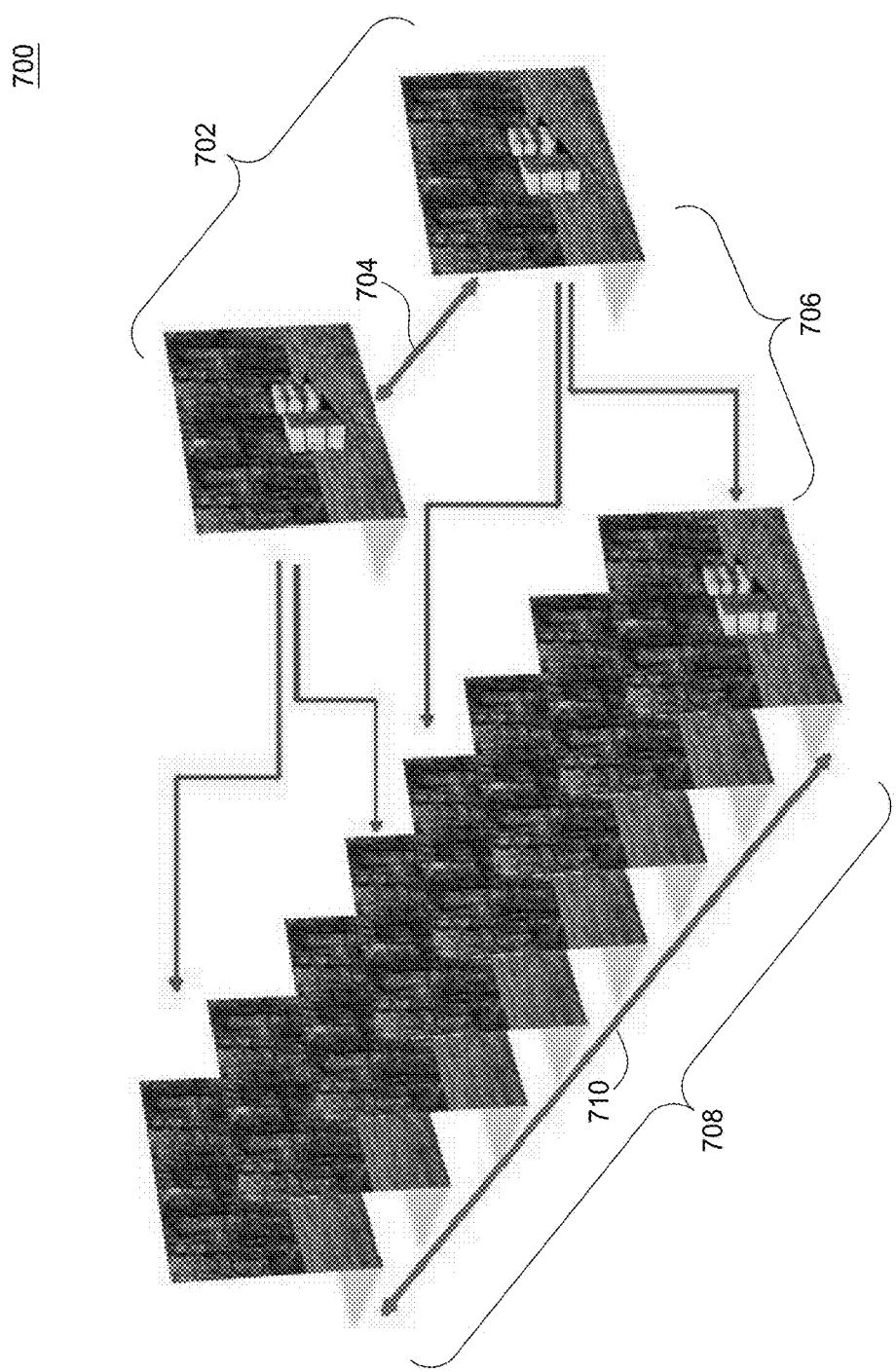
FIG. 7 is a depiction of warping a pair of input views of a source disparity range, to a set of multiscopic views of a target disparity range, according to one embodiment presented in this disclosure.

FIG. 7 is a depiction 700 of warping a pair of input views 702 of a source disparity range 704, to a set of multiscopic views 708 of a target disparity range 710, according to one embodiment presented in this disclosure. In some embodiments, the input views are not among the resulting multiscopic views, which are created by interpolating between two warps, represented via arrows 706. To generate multiview content related to the determined disparity maps, the input images are mapped to virtual images corresponding to the determined disparity, and interpolation is performed; in some embodiments, both warps may be performed at once.

In some embodiments, the overall disparity range from the leftmost to the rightmost view of a multiview autostereoscopic display may typically be larger than the disparity range of the input pair. The disparity maps specify information pertaining to the expansion of the perceived disparity range. Within the expanded range, linear interpolation may be performed between the left and right input views as shown by the arrows 706. The disparity range between each image pair of the resulting set of multiscopic views 708 is then a fraction of the input disparity range. Such expansion of the overall disparity range with intermediate view rendering may not readily be attainable using an alternative approach of depth-image-based rendering. This is because depth-image-based rendering may result in dis-occlusions, which would require in-painting. Accordingly, image domain warping is instead used, which does not create dis-occlusions and which can handle the necessary disparity range expansions without creating noticeable artifacts, at least in some cases.

Assume the first set of multiview images are to be generated based on just the left input image. To that end, the application 102 determines adjustments to the input image according to the disparity change, such as by computing a first warp $w_{ext}(x)$ using the disparity map $D_{ext}=D_I-D_L$. This warp then describes the transformation of the left image to its adjusted, new left image that corresponds to the disparity map $D_L$. In addition, the application 102 may compute a second warp $w_{cen}(x)$ is computed that determines the transformation from the left input view to the center view between the left and right camera views. Both warps $w_{ext}(x)$ and $w_{cen}(x)$ may then be used to compute additional warps w(a) that transform the left input image to a first set of multiscopic views:

$$w(a) = a w_{ext}(x) + (1-a) w_{cen}(x) \text{ for } a=[0 \ldots 1] \quad \text{(Equation 11)}$$

where a=0 corresponds to the leftmost image, and a=1 corresponds to the center image. The second set of multiscopic views may then be generated in the same manner based on the right input view. The first and second sets of multiscopic views together constitute the multiscopic views 708 of the target disparity range 710.

In one embodiment, for synthetic scenes, the application 102 uses ground truth disparity maps and saliency maps rendered from object annotations. Doing so permits the artist to decide which objects should retain as much depth as possible, by assigning an importance value to these objects. The importance values are then rendered into a saliency map. For filmed scenes, the application 102 uses either automatically generated depth information or computed and additionally hand-tuned depth information. In a particular embodiment, the depth information may be represented in the form of a depth map. In some embodiments, for filmed scenes, the application 102 uses an extended, contrast-based saliency algorithm that incorporates edge-aware spatiotemporal smoothing to achieve temporal consistency. At least in some instances, multiview image sequences can be generated in fifteen to six hundred seconds per frame, depending on the input size and resolution of the image warp grid.

Figure 8:
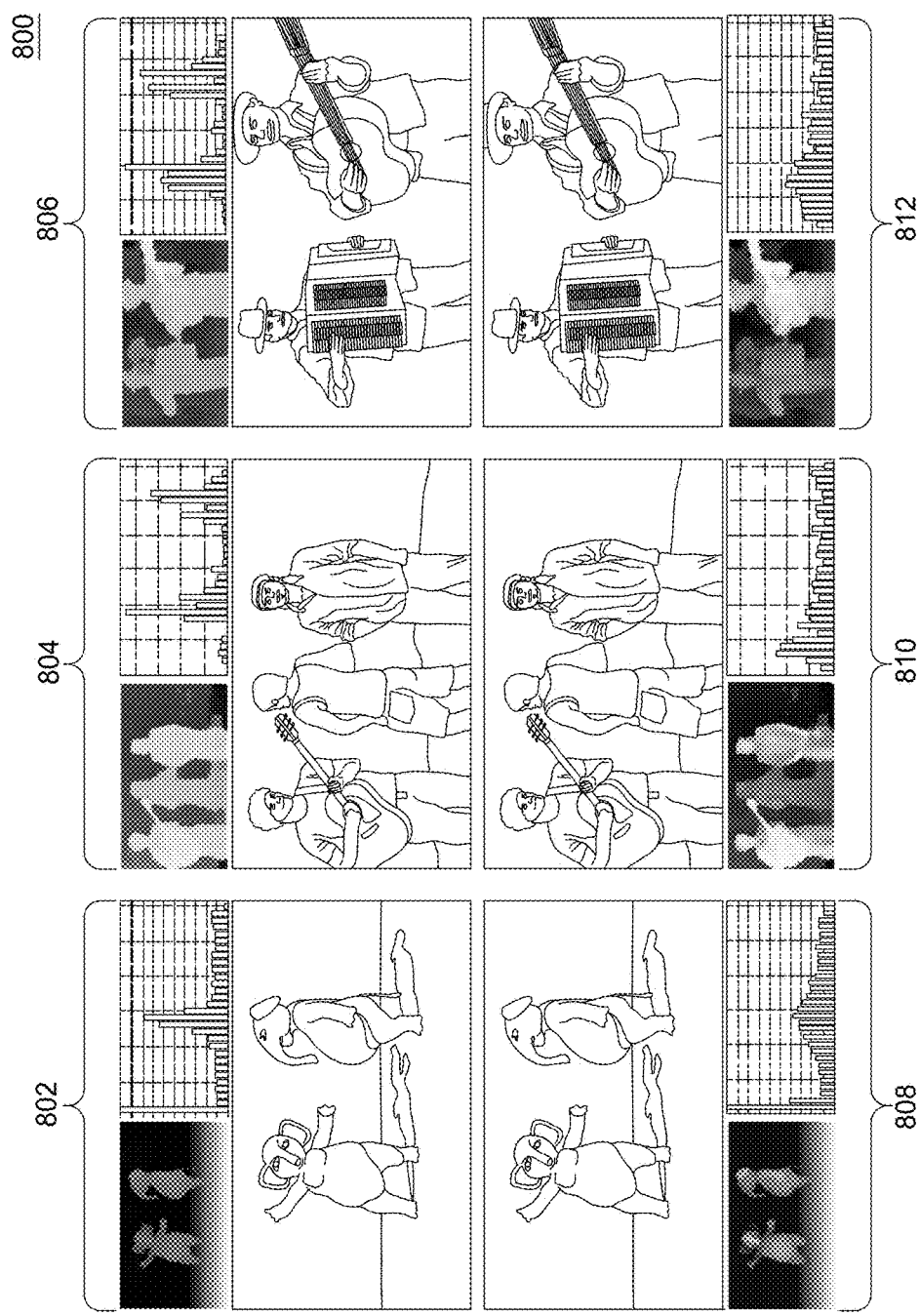
FIG. 8 is a depiction of anaglyph results of stereo-to-multiview conversion, accompanied with the associated disparity maps and histograms, according to one embodiment presented in this disclosure.

FIG. 8 is a depiction 800 of anaglyph results of stereo-to-multiview conversion, accompanied with the associated disparity maps and histograms, according to one embodiment presented in this disclosure. The results include a set 802 based on an alternative approach of linear mapping of a first scene, and a corresponding set 808 using saliency-based mapping techniques disclosed herein. The results also include a set 804 based on linear mapping of a second scene, and a corresponding set 810 using saliency-based mapping techniques. The results further include a set 806 based on linear mapping of a third scene, and a corresponding set 812 using saliency-based mapping techniques. As shown, the sets 808, 810, 812 feature enhanced depth of the salient image regions, at least when compared to the sets 802, 804, 806, respectively. Further, the sets 808, 810, 812 effectively compress less salient image regions and empty disparity ranges. Accordingly, the sets 808, 810, 812 feature objects that appear rounder and more voluminous, thereby conveying a richer depth experience even for smaller depth ranges. Thus, saliency-based mapping techniques retain more depth volume for the salient regions of the scene while flattening out less salient regions as well as empty space, thereby effectively creating an increased apparent depth within the same overall depth limits relative to linear mapping.

Figure 9:
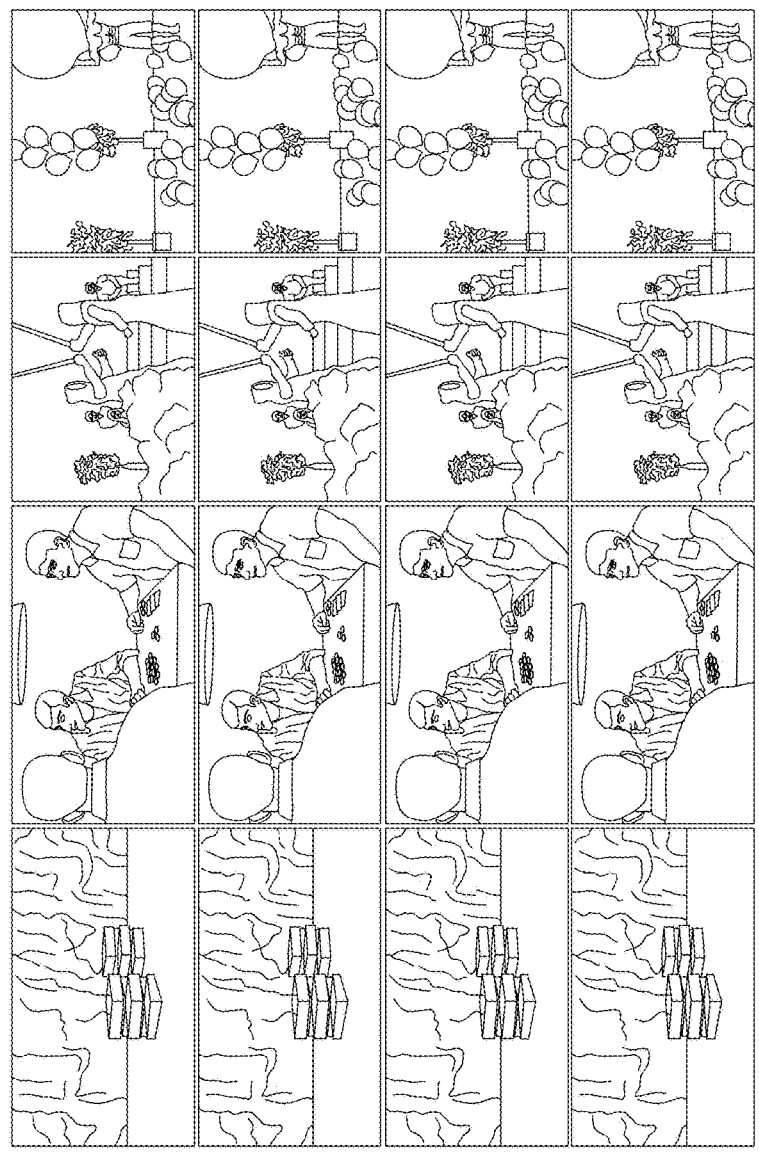
FIG. 9 is a depiction of multiview output generated for a variety of scenes, according to one embodiment presented in this disclosure.

FIG. 9 is a depiction 900 of multiview output generated for a variety of scenes, according to one embodiment presented in this disclosure. The depiction 900 includes multiview output 902 for a first scene, multiview output 904 for a second scene, multiview output 906 for a third scene, and multiview output 908 for a fourth scene. The multiview output may be generated using the saliency-based mapping techniques disclosed herein. As shown, the multiview output 902, 904, 906, 908 hide distortions in non-salient regions and limits noticeable artifacts. In particular, the artifacts are limited even for scenes with estimated depth information that, as described above, may contain inaccuracies in estimation.

Figure 10:
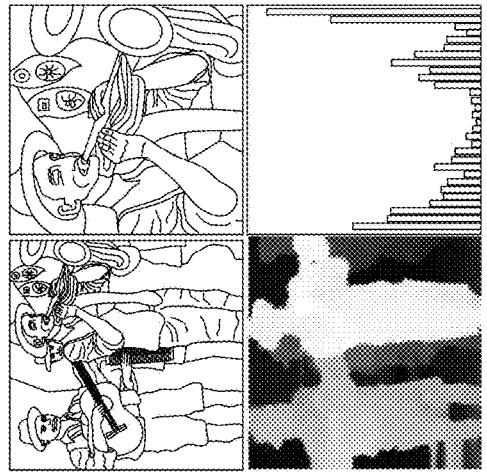
FIG. 10 is a depiction of results of linear mapping, saliency-based mapping, and perceptual disparity compression mapping, respectively, along with associated disparity maps and histograms, according to one embodiment presented in this disclosure.
Figure 10:
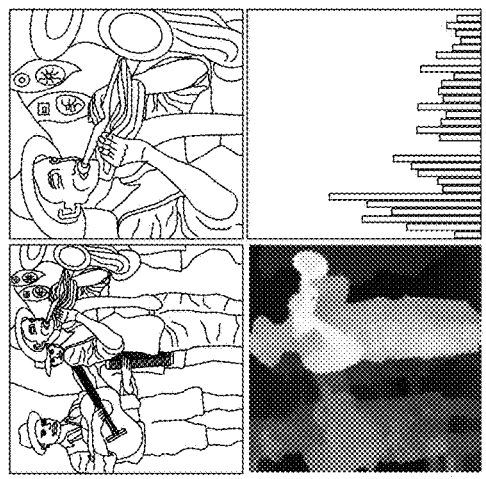
Figure 10:
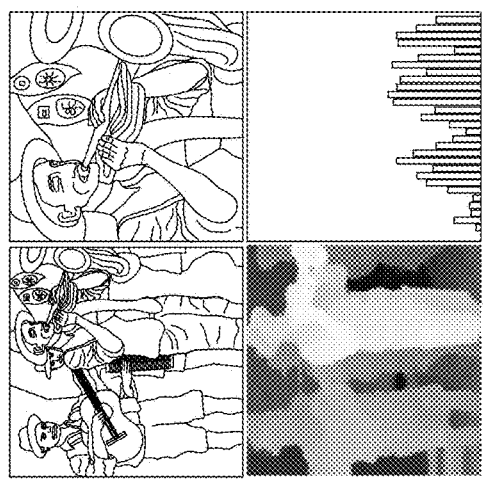

FIG. 10 is a depiction 1000 of results of linear mapping, saliency-based mapping, and perceptual disparity compression mapping, respectively, along with associated disparity maps and histograms, according to one embodiment presented in this disclosure. The results include a set 1002 based on linear mapping, a corresponding set 1004 using saliency-based mapping, and another corresponding set 1006 using an alternative approach of perceptual disparity compression mapping. As shown, linearly mapping the input range results in flattening the whole scene uniformly, which may result in loss of depth perception, or cardboarding. Both saliency-based mapping and perceptual disparity compression mapping target the same disparity range yet provide added depth perception, at least relative to linear mapping. In contrast to saliency-based mapping, which emphasizes salient image regions, perceptual disparity compression mapping uses a perceptual model for noticeable differences based on disparity, luminance and contrast. Although both saliency-based mapping and perceptual disparity compression mapping result in increased depth perception, the former approach better enhances the depth on the front-most subject in the scene while flattening less salient regions of the scene. The latter approach, on the other hand, retains just enough disparity for depth to be perceived uniformly across the image. Cardboarding effects, however, may be observed in the insets for linear mapping and perceptual disparity compression mapping.

Figure 11:
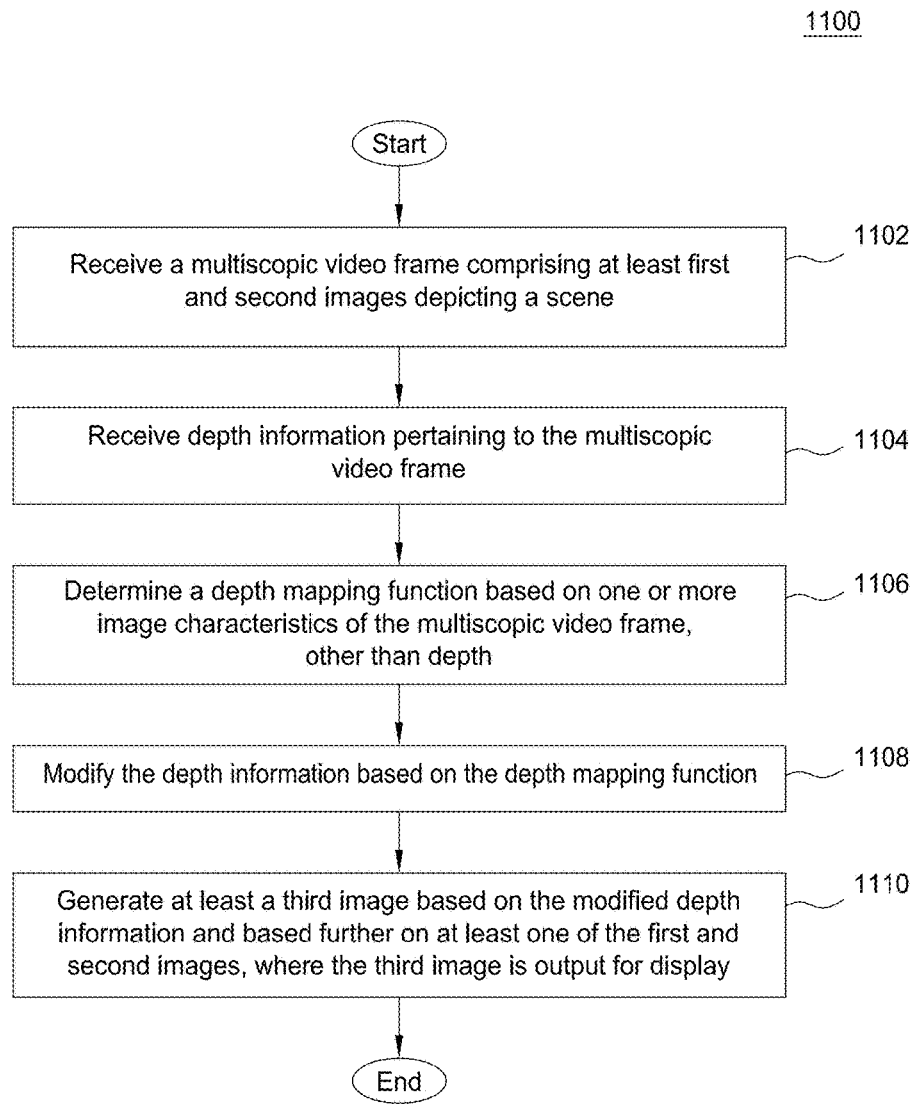
FIG. 11 is a flowchart depicting a method of depth modification for display applications, according to one embodiment presented in this disclosure.

FIG. 11 is a flowchart depicting a method 1100 of depth modification for display applications, according to one embodiment presented in this disclosure. The method 1100 may be performed by the application 102 of FIG. 1. As shown, the method 1100 begins at step 1102, where the application 102 receives a multiscopic video frame that includes at least first and second images depicting a scene. At step 1104, the application 102 receives depth information pertaining to the multiscopic video frame. At step 1106, the application 102 determines a depth mapping function based on one or more image characteristics of the multiscopic video frame, other than depth. At step 1108, the application 102 modifies the depth information based on the depth mapping function. At step 1110, the application 102 generates at least a third image based on the modified depth information and based further on at least one of the first and second images, where the third image is output for display. In some embodiments, the multiscopic video frame is augmented to include the generated third image in order to form multiview output of the scene and for the target autostereoscopic display.

In some embodiments, the first and second images are color images, and the depth information is pixel-specific depth information represented using depth values or disparity values. In a particular embodiment, the depth information is represented in the form of grayscale images. At least in some embodiments, the set of image characteristics includes at least saliency and edges, and the depth gradient of the at least one salient object is modified in order to restore perceived depth and salient scene structure. Depending on the embodiment, the image characteristics are identified based at least in part on user input or identified by analyzing the first and second images without requiring any user input. The third image is generated in order to facilitate a desired display application, e.g., display adaptation for a non-multiview stereoscopic display, stereoscopic-to-multiview conversion for an autostereoscopic display, artistic modification of a captured non-multiview stereoscopic scene, etc.

In one embodiment, the depth information, prior to modification, exceeds a depth range supported by a target display and measured based on a predefined, objective perception criterion. The depth information is modified in order to conform to the depth range supported by the target display. In a particular embodiment, the target display is a target autostereoscopic display. In some embodiments, the depth information is optionally further modified based on one or more predefined constraints, in order to alter a depth gradient of at least one salient region in depicted in the first and second images. An image mapping function is determined based on the further modified depth information, and the third image is generated based on the image mapping function and at least one of the first and second images. In alternative embodiments where the depth information is not further modified, the image mapping function is generated based on the depth information modified from step 1108, and the third image is generated based on the image mapping function and at least one of the first and second images.

In one embodiment, the scene depth is compressed, and the depth gradients are modified, using a predefined mapping algorithm configured to facilitate use of the depth range of the target autostereoscopic display, where the depth range may usually be smaller in extent than that of a non-autostereoscopic display, at least as measured based on a predefined perception criterion. Forming the multiview output thereby facilitates extending a perceived depth range of the scene. The predefined mapping is further configured to preserve artistic composition of a scene and perceived depth of the scene, even beyond a predefined degree of depth compression. Further still, the one or more predefined constraints include a gradient constraint and a global mapping constraint.

In one embodiment, saliency is used to determine flattening, and at least one area of the scene, not identified as being salient, undergoes a greater degree of depth compression than does at least one area of scene identified as being salient. The target autostereoscopic display is a multiview autostereoscopic display. The depth mapping function is a piecewise linear depth mapping function, and the multiview output is formed without performing any blurring or cardboarding of content in the scene, where cardboarding is characterized by voluminous objects having an unnaturally flat appearance when depth-compressed. The third image is generated based on the image mapping function and not based on any dense source stereoscopic information pertaining to the multiscopic video frame. At least in some embodiments, the image mapping function is determined based on the first and second images and based further on the modified depth information.

Accordingly, stereo-to-multiview conversion for the target autostereoscopic display is facilitated, and content adaptive depth mapping of the scene is implemented via image domain warping. At least in some embodiments, the depth mapping function is a different function than the image mapping function. In this regard, applying an arbitrary mapping function to the range of disparities may also be referred to herein as a "warp" of the disparity range (to transform depth)—not to be confused with a warp using the image mapping function (to deform one or more input views). However, applying the arbitrary mapping function to the range of disparities of an image sequence may be implemented by warping the images. That is, the images may be deformed in order to realize/implement the mapping function applied to the disparity range. "Warping" the disparity range (as opposed to deforming the actual images) may be illustrated by the following example. A vast-scene depth of landscapes can be combined with normal scene depth for characters to achieve artistic effects. In real-time stereo sports broadcasting such as football, it may be distracting to a viewer if nearby audience and distant players on the field are shown in close proximity to one another in a scene. The content producer may use the application to adjust the disparity of the nearby audience to achieve a more comfortable viewing experience. Accordingly, in comparison to image domain warping, at least some embodiments disclosed herein alters one of the inputs to image domain warping, e.g., the disparity map, which may be understood as a chart specifying where to move each pixel as part of the warping. At least in some embodiments, the images when warped exhibit characteristics similar to those of the disparity map, e.g., increasing roundness of salient objects, and the characteristics may be tailored to suit the needs of a particular case.

In some embodiments, the set of image characteristics includes: (i) a set of sparse disparities between the first image and the second image and (ii) a saliency map of at least one of the first image and the second image. The saliency map is determined by analyzing a predefined set of image attributes based on quaternion transform. Further, the predefined set of image attributes includes contrast, orientation, color, and intensity, and the quaternion transform is a two-dimensional Fourier transformation. Further still, the image mapping function is a non-linear warp function configured to operate in an image domain, based on the set of image characteristics. The set of image characteristics further includes an edge map of at least one of the first image and the second image. The non-linear warp function is determined by optimizing an energy equation based on the set of image characteristics and a set of associated weights.

In one embodiment, the multiscopic video frame is a stereoscopic video frame, and the third image is generated further based on at least one of interpolation and extrapolation. At least in some embodiments, the set of sparse disparities between the first image and the second image are derived from depth information having modified depth gradients. In an alternative embodiment, the set of sparse disparities are determined based on feature matching and optical flow analysis. In some embodiments, when increased content quality is desired, dense disparity maps may also be used. The edge map is determined based on edge detection and vertical line detection. The edge detection is based on a Canny algorithm, and the vertical line detection is based on a Hough transform. Further, the image mapping function is configured to, when generating the third image, preserve vertical edges and salient regions to a greater extent than other image aspects. Each of the first image, the second image, and third image may be multiscopically distinct.

Figure 12:
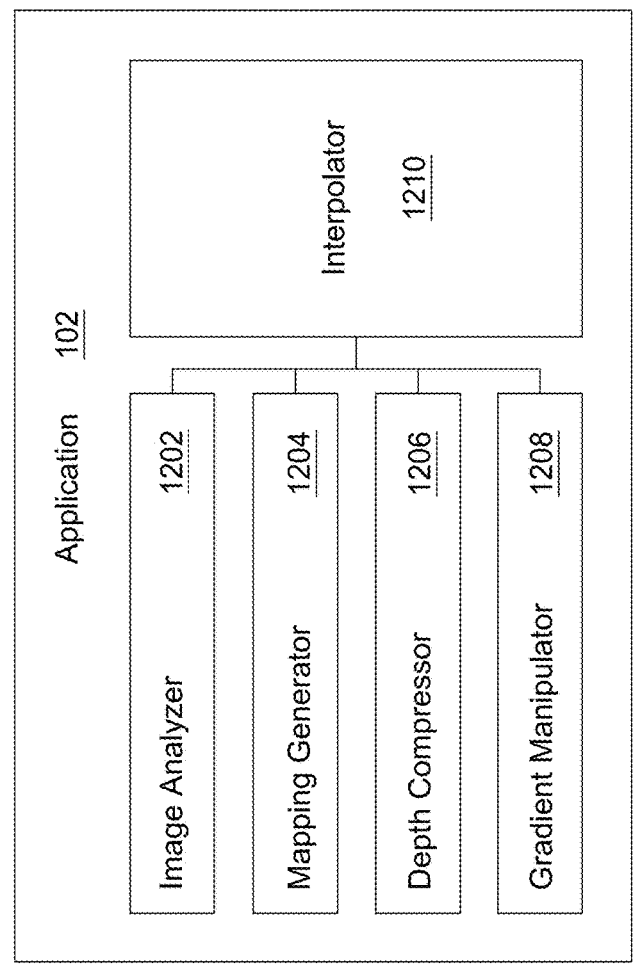
FIG. 12 is a block diagram illustrating components of an application for depth modification, according to one embodiment presented in this disclosure.

FIG. 12 is a block diagram illustrating components 1200 of the application 102 of FIG. 1, according to one embodiment presented in this disclosure. As shown, the components 1200 include an image analyzer 1202, a mapping generator 1204, a depth compressor 1206, a gradient manipulator 1208, and an interpolator 1210. In one embodiment, each component has respective source code and is uniquely identifiable via a respective, distinct component name. The image analyzer 1202 is configured to analyze images of a received multiscopic video frame to determine a set of image characteristics. The mapping generator 1204 is configured determine a depth mapping function and an image mapping function based on the set of image characteristics. The depth compressor 1206 is configured to compress depth of the images, based on the depth mapping function and a depth range supported by a target autostereoscopic display. The gradient manipulator 1208 is configured to alter depth gradients of salient regions depicted in the depth-compressed images, based on one or more predefined constraints. The interpolator 1210 is configured to generate new images based on the image mapping function, where the multiscopic video frame is augmented to new images in order to form multiview output of the scene. The components and names thereof may be tailored to suit the needs of a particular case.

Figure 13:
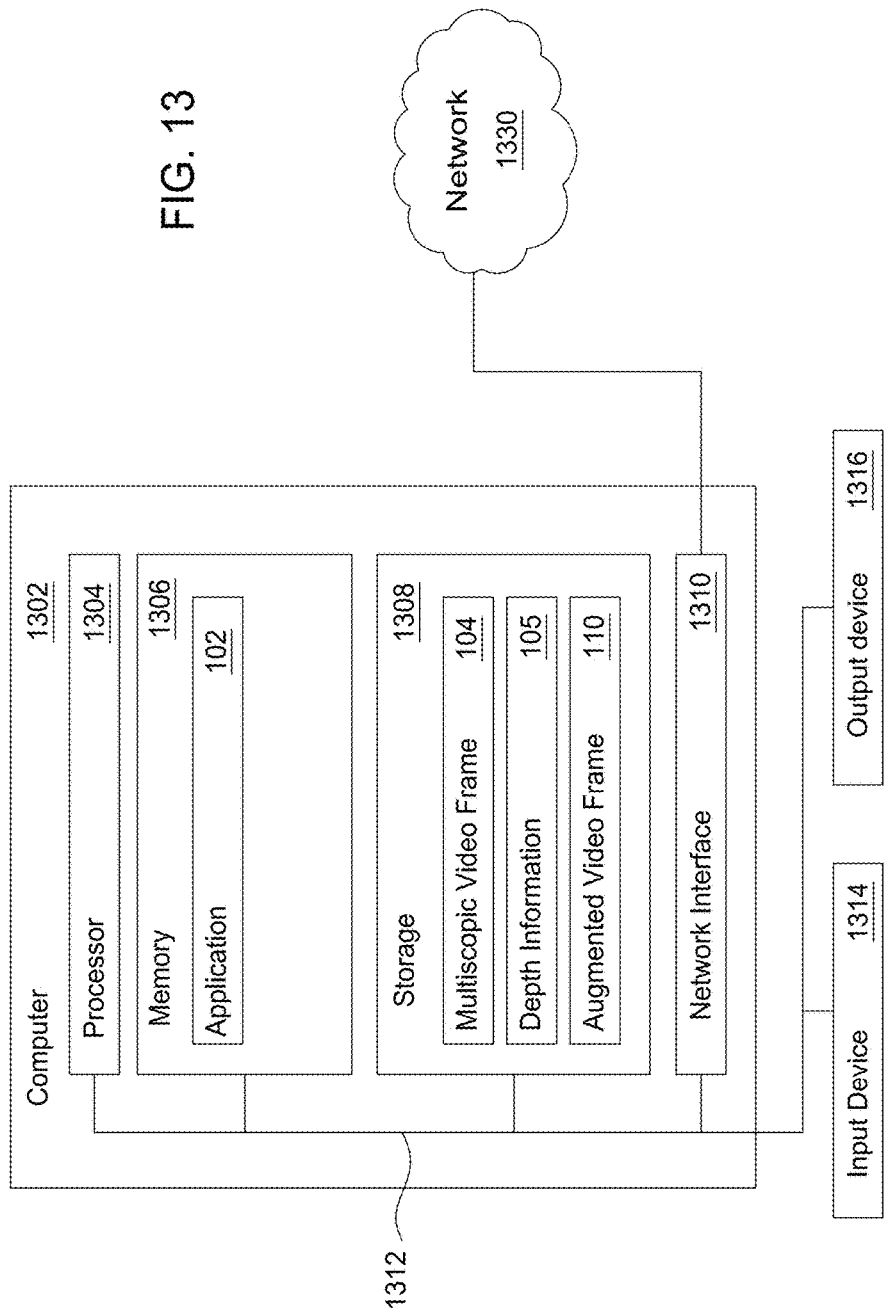
FIG. 13 is a block diagram illustrating a networked system for depth modification for display applications, according to one embodiment presented in this disclosure.

FIG. 13 is a block diagram illustrating a networked system 1300 for depth modification for display applications, according to one embodiment presented in this disclosure. As shown, the networked system 1300 includes a computer 1302. The computer 1302 may also be connected to other computers via a network 1330. In general, the network 1330 may be a telecommunications network and/or a wide area network (WAN). In a particular embodiment, the network 1330 is the Internet.

The computer 1302 generally includes a processor 1304 connected via a bus 1312 to a memory 1306, a network interface device 1310, a storage 1308, an input device 1314, and an output device 1316. The computer 1302 is generally under the control of an operating system. Examples of operating systems include UNIX, versions of the Microsoft Windows® operating system, and distributions of the Linux® operating system. More generally, any operating system supporting the functions disclosed herein may be used. The processor 1304 is included to be representative of a single CPU, multiple CPUs, a single CPU having multiple processing cores, and the like. Similarly, the memory 1306 may be a random access memory. While the memory 1306 is shown as a single entity, it should be understood that the memory 1306 may comprise a plurality of modules, and that the memory 1306 may exist at multiple levels, from high speed registers and caches to lower speed but larger DRAM chips. The network interface device 1310 may be any type of network communications device allowing the computer 1302 to communicate with other computers via the network 1330.

The storage 1308 may be a persistent storage device. Although the storage 1308 is shown as a single unit, the storage 1308 may be a combination of fixed and/or removable storage devices, such as fixed disc drives, solid state drives, floppy disc drives, tape drives, removable memory cards or optical storage. The memory 1306 and the storage 1308 may be part of one virtual address space spanning multiple primary and secondary storage devices.

The input device 1314 may be any device for providing input to the computer 1302. For example, a keyboard and/or a mouse may be used. The output device 1316 may be any device for providing output to a user of the computer 1302. For example, the output device 1316 may be any conventional display screen or set of speakers. Although shown separately from the input device 1314, the output device 1316 and input device 1314 may be combined. For example, a display screen with an integrated touch-screen may be used.

As shown, the memory 1306 of the computer 1302 includes the application 102, and the storage 1308 of the computer 1302 includes the multiscopic video frame 104, the depth information 105, and the augmented video frame 110. As described above, in one embodiment, the application 102 is configured to generate the augmented video frame 110 based on the multiscopic video frame 104 and the depth information 105 and according to the saliency-based mapping techniques disclosed herein. Depending on the embodiment, one or more of the multiscopic video frame 104, the depth information 105, and the augmented video frame 110 may be stored on one or more other computers connected to the computer 1302 via the network 1330.

Accordingly, embodiments in this disclosure provide techniques for depth modification for display applications. One embodiment provides an application configured to receive a multiscopic video frame including at least first and second images depicting a scene. The application is further configured to receive depth information pertaining to the multiscopic video frame. The application is further configured to determine a depth mapping function based on one or more image characteristics of the multiscopic video frame, other than depth. The application is further configured to modify the depth information based on the depth mapping function. The application is further configured to generate at least a third image based on the modified depth information and based further on at least one of the first and second images, wherein the third image is output for display.

Further, at least some embodiments in this disclosure provide techniques for saliency-based stereo-to-multiview conversion to generate content suited for autostereoscopic multiview displays. Global depth mapping is performed that flattens out non-salient image regions while retaining salient image regions. The disparity gradients for salient regions are then enhanced. An extended image domain warping algorithm is used to render the output views according to the modified disparity maps. Doing so improves depth perception in the resultant scene and leads to rounder, more voluminous objects while introducing fewer artifacts, at least when compared to alternative approaches, such as those that use linear mapping. Accordingly, at least in some cases, the artistic intent of a scene depicted in the input views may be more faithfully retained, without sacrificing perceptible image quality. In addition, the extended image domain warping may be robust even against temporally unstable and inaccurate disparity maps.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, a user of the application 102 may submit the multiscopic video frame 104 for processing by the application 102 executing in the cloud and to generate and store the augmented video frame 110 in the cloud. Thus, the user may access the augmented video frame 110 from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to programmatically conform multiscopic video content to restricted depth ranges supported by autostereoscopic displays, the computer-implemented method comprising:
   receiving a multiscopic video frame comprising at least first and second images depicting a scene;
   receiving depth information pertaining to the multiscopic video frame and exceeding a depth range supported by a target autostereoscopic display as measured based on a predefined perception criterion, wherein the supported depth range is smaller in extent than that of a non-autostereoscopic display, wherein the depth information comprises pixel-specific depth information represented as one or more grayscale images;
   determining a depth mapping function based on one or more image characteristics of the multiscopic video frame, other than depth, the one or more image characteristics including at least saliency and edges;
   modifying the depth information based on the depth mapping function and using: a mapping algorithm that at least partially preserves perceptible depth in the scene with a predefined degree of depth compression and by accounting for the depth range supported by the target autostereoscopic display, wherein the modified depth information conforms to the depth range supported by the target autostereoscopic display;
   at least partially preserving, in a third image, the saliency and edges of the multiscopic video frame, by generating the third image by operation of one or more computer processors and based on (i) the modified depth information and (ii) at least one of the first and second images; and extending a perceptible depth range of the scene by forming multiview output for the target autostereoscopic display, including augmenting the multiscopic video frame to include the generated third image, wherein the augmented multiscopic video frame is output for display via the target auto stereoscopic display.

2. The computer-implemented method of claim 1, wherein the first and second images comprise first and second color images, wherein the depth information is represented in the form of depth values or disparity values;

wherein the one or more image characteristics are identifiable based at least in part on user input and also identifiable by analyzing at least the first and second images of the multiscopic video frame without requiring user input.

3. The computer-implemented method of claim 2, further comprising:

restoring perceptible depth of at least one salient object in the scene, by altering a depth gradient of at least one salient region depicted in the first and second images, wherein altering the depth gradient includes further modifying the depth information based on one or more predefined constraints;

determining an image mapping function based on the further modified depth information, wherein the third image is generated based on the image mapping function and based further on at least one of the first and second images.

4. The computer-implemented method of claim 3, wherein the one or more predefined constraints include a gradient constraint and a global mapping constraint, wherein the saliency is used to determine flattening, wherein at least one region of the scene, not identified as being salient, undergoes a greater degree of depth compression in the third image than does at least one region of the scene identified as being salient, wherein the target autostereoscopic display comprises a multiview autostereoscopic display.

5. The computer-implemented method of claim 4, wherein the depth mapping function comprises a piecewise linear depth mapping function, wherein the multiview output is formed without performing any blurring or cardboarding of content in the scene, wherein cardboarding comprises a voluminous object having an unnaturally flat appearance when depth compressed, wherein the third image is generated based on the image mapping function and not based on any dense source stereoscopic information pertaining to the multiscopic video frame, wherein the multiscopic video frame is a stereoscopic video frame, wherein the computer-implemented method comprises:

performing stereo-to-multiview conversion for the target autostereoscopic display, by converting the stereoscopic video frame, consisting of the first and second images, to a multiscopic video frame comprising the first, second, and third images, based on the depth range of the target autostereoscopic display, wherein converting the stereoscopic video frame comprises the determining, modifying, and generating steps.

6. The computer-implemented method of claim 5, wherein the depth mapping function comprises a different function than the image mapping function and performs content adaptive depth mapping via image domain warping; wherein the one or more characteristics includes: (i) a set of sparse disparities between the first image and the second image and (ii) a saliency map of at least one of the first image and the second image; wherein the saliency map is determined by analyzing a predefined set of image attributes based on quaternion transform, wherein the predefined set of image attributes includes contrast, orientation, color, and intensity, wherein the quaternion transform comprises a two-dimensional Fourier transformation;

wherein image mapping function comprises a non-linear warp function configured to operate in an image domain, based on the one or more image characteristics, wherein the one or more image characteristics further includes an edge map of at least one of the first image and the second image, wherein the non-linear warp function is determined by optimizing an energy equation based on the one or more image characteristics and a set of associated weights;

wherein the third image is generated further based on at least one of interpolation and extrapolation, wherein the edge map is determined based on edge detection and vertical line detection, wherein the edge detection is based on a Canny algorithm, wherein the vertical line detection is based on a Hough transform;

wherein the computer-implemented method comprises:

preserving, in the third image, vertical edges and salient regions from the scene to a greater extent than other image aspects from the scene, by generating the third image based on the image mapping function and based further on at least one of the first and second images, wherein each of the first image, the second image, and third image is multiscopically distinct.

7. A non-transitory computer-readable medium containing a program which, when executed, performs an operation to programmatically conform multiscopic video content to restricted depth ranges supported by autostereoscopic displays, the operation comprising:

receiving a multiscopic video frame comprising at least first and second images depicting a scene;

receiving depth information pertaining to the multiscopic video frame and exceeding a depth range supported by a target autostereoscopic display as measured based on a predefined perception criterion, wherein the supported depth range is smaller in extent than that of a non-autostereoscopic display, wherein the depth information comprises pixel-specific depth information represented as one or more grayscale images;

determining a depth mapping function based on one or more image characteristics of the multiscopic video frame, other than depth, the one or more image characteristics including at least saliency and edges;

modifying the depth information based on the depth mapping function and using: a mapping algorithm that at least partially preserves perceptible depth in the scene with a predefined degree of depth compression and by accounting for the depth range supported by the target autostereoscopic display, wherein the modified depth information conforms to the depth range supported by the target autostereoscopic display;

at least partially preserving, in a third image, the saliency and edges of the multiscopic video frame, by generating the third image by operation of one or more computer processors when executing the program and based on (i) the modified depth information and (ii) at least one of the first and second images; and extending a perceptible depth range of the scene by forming multiview output for the target autostereoscopic display, including augmenting the multiscopic video frame to include the generated third image, wherein the augmented multiscopic video frame is output for display via the target autostereoscopic display.

8. A system to programmatically conform multiscopic video content to restricted depth ranges supported by autostereoscopic displays, the system comprising:
one or more computer processors;
a memory containing a program which, when executed by the one or more computer processors, performs an operation comprising:
receiving a multiscopic video frame comprising at least first and second images depicting a scene;
receiving depth information pertaining to the multiscopic video frame and exceeding a depth range supported by a target autostereoscopic display as measured based on a predefined perception criterion, wherein the supported depth range is smaller in extent than that of a non-autostereoscopic display, wherein the depth information comprises pixel-specific depth information represented as one or more grayscale images;
determining a depth mapping function based on one or more image characteristics of the multiscopic video frame, other than depth, the one or more image characteristics including at least saliency and edges;
modifying the depth information based on the depth mapping function and using: a mapping algorithm that at least partially preserves perceptible depth in the scene with a predefined degree of depth compression and by accounting for the depth range supported by the target autostereoscopic display, wherein the modified depth information conforms to the depth range supported by the target autostereoscopic display;
at least partially preserving, in a third image, the saliency and edges of the multiscopic video frame, by generating the third image based on (i) the modified depth information and (ii) at least one of the first and second images; and
extending a perceptible depth range of the scene by forming multiview output for the target autostereoscopic display, including augmenting the multiscopic video frame to include the generated third image, wherein the augmented multiscopic video frame is output for display via the target autostereoscopic display.

9. The computer-implemented method of claim 1, wherein the first and second images comprise first and second color images.

10. The computer-implemented method of claim 1, wherein the depth information is represented in the form of depth values or disparity values.

11. The computer-implemented method of claim 1, wherein the target autostereoscopic display comprises a multiview autostereoscopic display.

12. The non-transitory computer-readable medium of claim 7, wherein the first and second images comprise first and second color images.

13. The non-transitory computer-readable medium of claim 7, wherein the depth information is represented in the form of depth values or disparity values.

14. The system of claim 8, wherein the first and second images comprise first and second color images.

15. The system of claim 8, wherein the depth information is represented in the form of depth values or disparity values.

16. The system of claim 8, wherein the target autostereoscopic display comprises a multiview autostereoscopic display.

17. The computer-implemented method of claim 1, further comprising:
restoring perceptible depth of at least one salient object in the scene, by altering a depth gradient of at least one salient region depicted in the first and second images.

18. The computer-implemented method of claim 17, wherein altering the depth gradient includes further modifying the depth information based on one or more predefined constraints.

19. The non-transitory computer-readable medium of claim 7, wherein the operation further comprises:
restoring perceptible depth of at least one salient object in the scene, by altering a depth gradient of at least one salient region depicted in the first and second images.

20. The system of claim 8, wherein the operation further comprises:
restoring perceptible depth of at least one salient object in the scene, by altering a depth gradient of at least one salient region depicted in the first and second images.

* * * * *

UNITED STATES PATENT AND TRADEMARK OFFICE
CERTIFICATE OF CORRECTION

PATENT NO.         : 10,095,953 B2
APPLICATION NO.    : 14/289328
DATED              : October 9, 2018
INVENTOR(S)        : Aljosa Aleksej Andrej Smolic et al.

Page 1 of 1

It is certified that error appears in the above-identified patent and that said Letters Patent is hereby corrected as shown below:

In the Specification

In Column 9, Line 51, after "$D_L(x)=D_G(x)$" insert -- . --.

In Column 10, Line 1, delete "$(D_L(x)-D_G(x)\|^2.$" and insert -- $(D_L(x)-D_G(x))^2$. --, therefor.

In the Claims

In Column 21, Line 9, in Claim 1, delete "auto stereoscopic" and insert -- autostereoscopic --, therefor.

Signed and Sealed this
Twenty-fifth Day of December, 2018

Andrei Iancu
*Director of the United States Patent and Trademark Office*